United States Patent
Imagawa

(10) Patent No.: US 8,244,040 B2
(45) Date of Patent: Aug. 14, 2012

(54) OBJECT POSITION RECOGNITION SYSTEM, OBJECT POSITIONING SYSTEM, AND SYSTEM AND METHOD FOR ADJOINING OBJECTS

(75) Inventor: Tsuyoshi Imagawa, Chiyoda-ku (JP)

(73) Assignee: Mitsubishi Electric Corporation, Chiyoda-Ku, Tokyo (JP)

( * ) Notice: Subject to any disclaimer, the term of this patent is extended or adjusted under 35 U.S.C. 154(b) by 310 days.

(21) Appl. No.: 12/755,598

(22) Filed: Apr. 7, 2010

(65) Prior Publication Data

US 2011/0033116 A1    Feb. 10, 2011

(30) Foreign Application Priority Data

Aug. 5, 2009    (JP) ................... 2009-182477

(51) Int. Cl.
G06K 9/48 (2006.01)
G06K 9/40 (2006.01)
(52) U.S. Cl. .................... 382/199; 382/266
(58) Field of Classification Search .............. 382/199, 382/266
See application file for complete search history.

(56) References Cited

U.S. PATENT DOCUMENTS

| 4,031,383 | A | * | 6/1977 | Hosoe et al. ............... 250/201.7 |
| 4,818,873 | A | * | 4/1989 | Herriot ....................... 250/310 |
| 5,528,703 | A | * | 6/1996 | Lee ............................ 382/257 |
| 5,619,587 | A | * | 4/1997 | Willoughby et al. ....... 382/141 |
| 6,987,875 | B1 | * | 1/2006 | Wallack ...................... 382/146 |
| 7,430,320 | B2 | * | 9/2008 | Lee et al. ................... 382/173 |
| 7,502,170 | B2 | | 3/2009 | Nakano et al. |
| 7,813,553 | B2 | * | 10/2010 | Suzuki et al. .............. 382/190 |
| 7,873,219 | B2 | * | 1/2011 | Friedhoff ................... 382/199 |
| 8,131,102 | B2 | * | 3/2012 | Albiez et al. .............. 382/266 |
| 2005/0238222 | A1 | | 10/2005 | Nakano et al. |
| 2011/0033116 | A1 | * | 2/2011 | Imagawa .................... 382/199 |

FOREIGN PATENT DOCUMENTS

| JP | 6-241759 A | 9/1994 |
| JP | 9-42915 A | 2/1997 |
| JP | 9-89525 A | 4/1997 |
| JP | 2000-24880 A | 1/2000 |
| JP | 2001-12920 A | 1/2001 |
| JP | 2004-69612 A | 3/2004 |
| JP | 4122187 B2 | 7/2008 |

* cited by examiner

Primary Examiner — Aaron W Carter
(74) Attorney, Agent, or Firm — Buchanan Ingersoll & Rooney PC

(57) ABSTRACT

A system recognizes the outline of an object that includes, at its edge, a portion including a rollover or a chipped portion. An image processing unit finds an outline of an object having a flat face from an image captured perpendicular to the flat face. A dark-transition-boundary detecting unit detects, on each of a plurality of recognition lines, a possible boundary point of dark-transition where a bright-to-dark transition occurs from outside toward inside of the object. A bright-transition-boundary detecting unit detects a possible boundary point of bright-transition where a dark-to-bright transition occurs from outside toward inside of the object. An edge detecting unit detects an edge point on the basis of the possible dark-transition-boundary point and the possible bright-transition-boundary point. An outline-determining unit determines an outline of the object that minimizes the sum of deviations between the outline and the respective edge points detected on the recognition lines.

18 Claims, 13 Drawing Sheets

Fig.12(1)
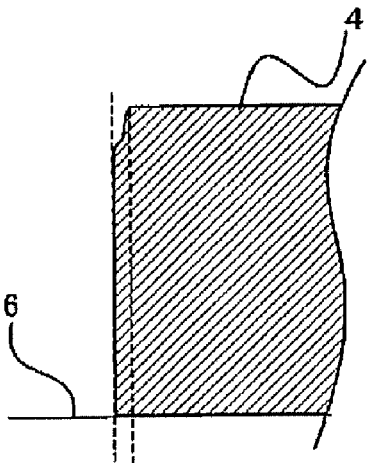
Fig.12(2)
Fig.12(3)
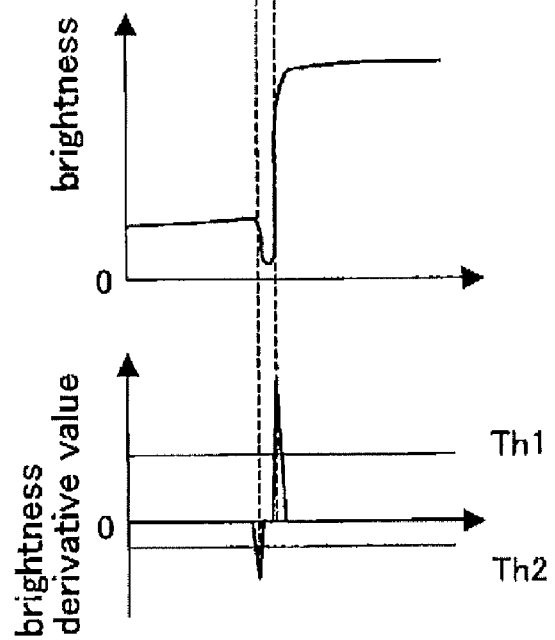

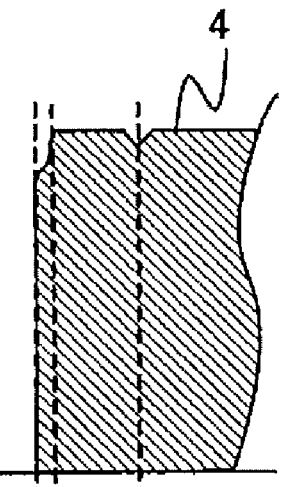
Fig.15(1)
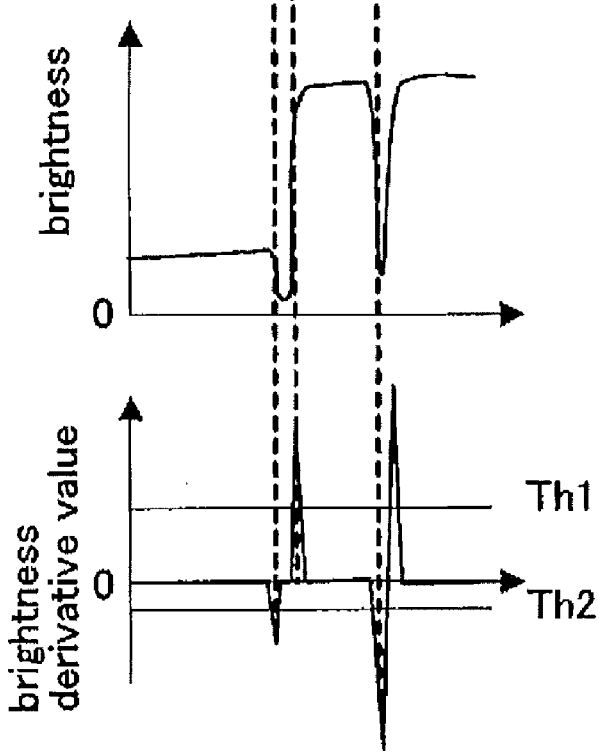
Fig.15(2)
Fig.15(3)

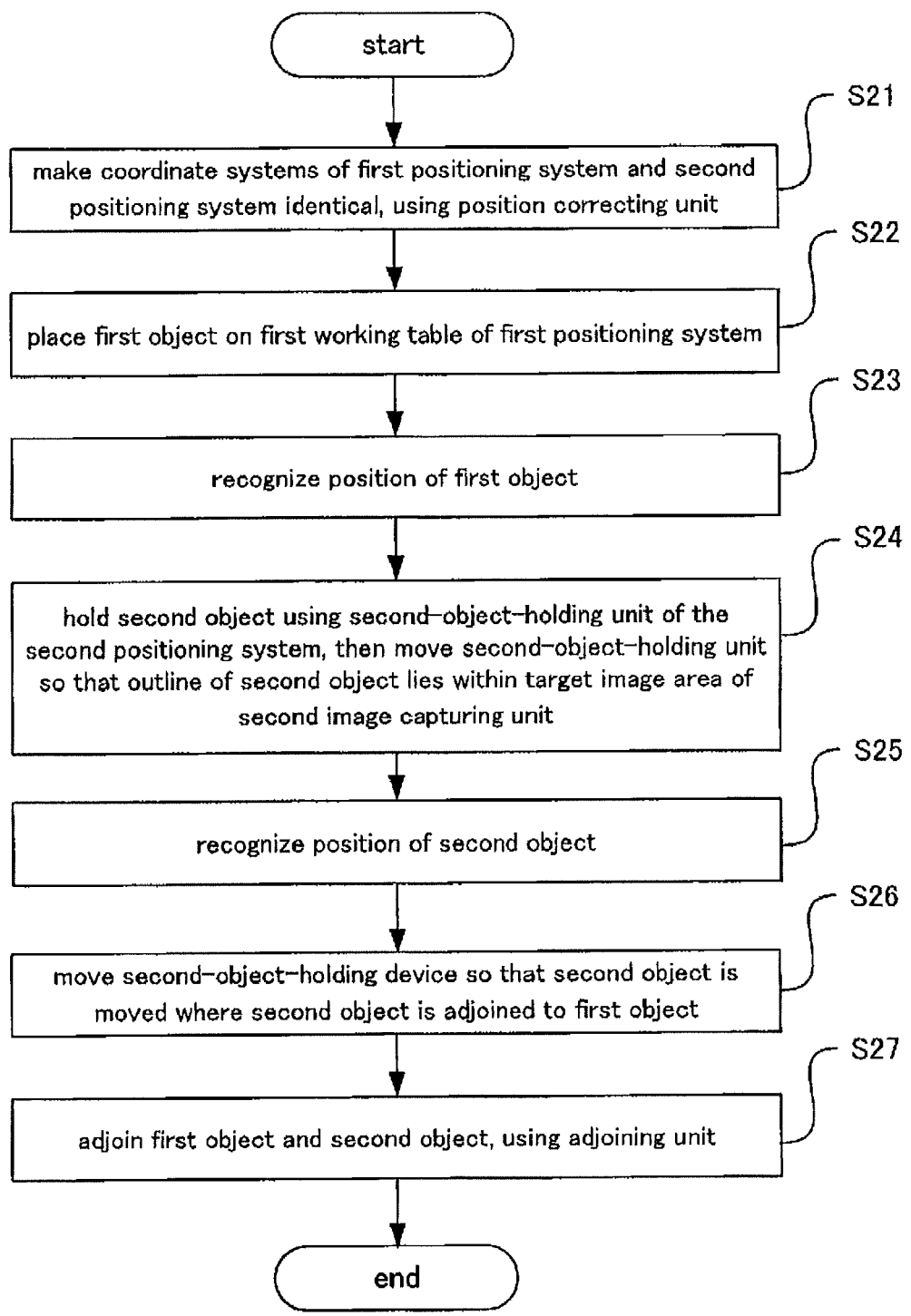

OBJECT POSITION RECOGNITION SYSTEM, OBJECT POSITIONING SYSTEM, AND SYSTEM AND METHOD FOR ADJOINING OBJECTS

BACKGROUND OF THE INVENTION

1. Field of the Invention

The present invention relates to a system that precisely recognizes the position of an object which is too small to be marked, a positioning-system that recognizes the position of an object and positions the object to a predetermined place, and an object adjoining system and method in which positions of a plurality of objects are recognized, and the objects are positioned and then adjoined in a given relation to each other.

2. Description of the Related Art

As a method for recognizing the position of an object (object-position recognition), there is a method that performs recognition by using an image processing on the basis of its outer shape. In the position recognition using image processing, it is necessary to detect an image corresponding to an outer shape to be recognized in a captured image.

When performing the recognition for a center position of a hole made in the object, if an image is captured by an optical system having an angle of view, the captured image inevitably has that of a hole wall portion, which may cause deviation in recognized position of the hole edge on image basis. To address the problem, a method is applied in which the applicable target hole is limited to the round one, a captured image of a coordinate system is converted to that of a polar coordinate system and then a possible range of position for the hole edge is determined by circumferential brightness of its projection image. In the example of this method, the hole edge is determined to exist between where the brightness value is ten percent smaller than the maximum brightness value in the projection image and where the brightness value is ten percent larger than the minimum. In the possible edge range, each position of the edge on each line in radial direction is detected using a differential processing, so that a circle corresponding to the round hole is determined by applying the least squares method to the detected positions of the edge (Patent document 1: Japanese Patent Laid-Open No. 1997 (H09)-42915).

Further more, there is a method that recognizes an object having a mirror-like surface or a concave/convex shape using image processing, in which uniform illumination that enables image processing is made on the object and its concave/convex portion as well, by the illumination using an illumination device configured with integrated means of epi-illumination and diffuse illumination, brightness of which are independently adjustable (Patent document 2: United States Patent Application Publication No. 2005/0238222, Japanese Patent No. 4122187).

SUMMARY OF THE INVENTION

In the method according to Patent document 1, the applicable targets is limited to a round hole, thus a line position in the outer shape of an object cannot be detected.
In the method according to Patent document 2, a special illumination device is needed; furthermore, if a slope face of the convex/concave portion inclines more than 45 degrees with respect to an optical axis of a camera, it is necessary to illuminate the object from below its surface level, which results in that the illuminating device is hard to be configured.

The present invention is made to precisely recognize the position of an object that is too small to be marked, based on the outline of the object, even if it has chipped portions on its outer shape and the like.

An object positioning system according to an aspect of the present invention recognizes a position of an object having a flat face on the basis of its outline in a captured image of the object and positions the object at a predetermined place, and the object positioning system includes an image capturing unit that captures an image of the object from a direction perpendicular to the flat face of the object, an illuminating unit that illuminates the flat face of the object from a direction parallel to an optical axis of the image capturing unit, an image processing unit that performs calculations to find an outline of the object in the image captured by the image capturing unit, and an object arranging unit that moves the object, wherein the image processing unit includes a recognition-line setting unit that sets a plurality of recognition lines that are to be across the outline of the object in the image captured by the image capturing unit, a brightness-detecting unit that detects brightness of image on each of the recognition lines, a possible dark-transition-boundary detecting unit that detects, on each of the recognition lines, a possible boundary point of dark-transition where a bright-to-dark transition in brightness occurs from outside toward inside of the object, a possible bright-transition-boundary detecting unit that detects, on each of the recognition lines, a possible boundary point of bright-transition where a dark-to-bright transition in brightness occurs from outside toward inside of the object, an edge detecting unit that detects, on each of the recognition lines, an edge point on the basis of the possible dark-transition-boundary point and the possible bright-transition-boundary point, and an outline-determining unit that determines an outline of the object so that the outline minimizes the sum of deviations between the outline and the respective edge points detected on the recognition lines.

An object position recognition system according to an aspect of the present invention recognizes an outline of an object having a flat face in a captured image of the object and recognizes the position of the object on the basis of the position of the outline, and the object positioning system includes an image capturing unit that captures an image of the object from a direction perpendicular to the flat face of the object, an illuminating unit that illuminates the flat face of the object from a direction parallel to an optical axis of the image capturing unit, and an image processing unit that performs calculations to find an outline of the object in the image captured by the image capturing unit, wherein the image processing unit includes a recognition-line setting unit that sets a plurality of recognition lines that are to be across the outline of the object in the image captured by the image capturing unit, a brightness-detecting unit that detects brightness of image on each of the recognition lines, a possible dark-transition-boundary detecting unit that detects, on each of the recognition lines, a possible boundary point of dark-transition where a bright-to-dark transition in brightness occurs from outside toward inside of the object, a possible bright-transition-boundary detecting unit that detects, on each of the recognition lines, a possible boundary point of bright-transition where a dark-to-bright transition in brightness occurs from outside toward inside of the object, an edge detecting unit that detects, on each of the recognition lines, an edge point on the basis of the possible dark-transition-boundary point and the possible bright-transition-boundary point, and an outline-determining unit that determines an outline of the object so that the outline minimizes the sum of deviations between the outline and the respective edge points detected on the recognition lines.

A method for adjoining objects according to an aspect of the present invention adjoins together a first object and a second object having a flat face, and the method includes a position correcting step of performing matching between a coordinate system used for recognizing position of the first object and a coordinate system used for recognizing position of the second object, a first position recognition step of recognizing position of the first object, a second position recognition step of recognizing position of the second object, an arranging step of moving, the second object to a place at which the first object and the second object are to be adjoined together, and an adjoining step of adjoining the first object and the second object are adjoined together, wherein the second position recognition step includes a recognition-line setting step of setting a plurality of recognition lines that are to be across the outline of the second object in its captured image, an image capturing step of capturing an image of the second object being illuminated is captured, a brightness-detecting step of detecting brightness of image on each of the recognition lines, a possible dark-transition-boundary detecting step of detecting, on each of the recognition lines, a possible boundary point of dark-transition where a bright-to-dark transition in brightness occurs from outside toward inside of the second object, a possible bright-transition-boundary detecting step of detecting, on each of the recognition lines, a possible boundary point of bright-transition where a dark-to-bright transition in brightness occurs from outside toward inside of the second object, an edge-point detecting step of detecting, on each of the recognition lines, an edge point of the second object on the basis of the possible dark-transition-boundary point and the possible bright-transition-boundary point, and an outline-determining step of determining an outline of the second object so that the outline minimizes the sum of deviations between the outline and the respective edge points detected on the recognition lines, to recognize the position of the second object according to the determined outline.

An object positioning system according to an aspect of the present invention recognizes a position of an object having a flat face on the basis of its outline in a captured image of the object and positions the object at a predetermined place, and the object positioning system includes an image capturing unit that captures an image of the object from a direction perpendicular to the flat face of the object, an illuminating unit that illuminates the flat face of the object from a direction parallel to an optical axis of the image capturing unit, an image processing unit that performs calculations to find an outline of the object in the image captured by the image capturing unit, and an object arranging unit that moves the object, wherein the image processing unit includes a recognition-line setting unit that sets a plurality of recognition lines that are to be across the outline of the object in the image captured by the image capturing unit, a brightness-detecting unit that detects brightness of image on each of the recognition lines, a possible dark-transition-boundary detecting unit that detects, on each of the recognition lines, a possible boundary point of dark-transition where a bright-to-dark transition in brightness occurs from outside toward inside of the object, a possible bright-transition-boundary detecting unit that detects, on each of the recognition lines, a possible boundary point of bright-transition where a dark-to-bright transition in brightness occurs from outside toward inside of the object, an edge detecting unit that detects, on each of the recognition lines, an edge point on the basis of the possible dark-transition-boundary point and the possible bright-transition-boundary point, and an outline-determining unit that determines an outline of the object so that the outline minimizes the sum of deviations between the outline and the respective edge points detected on the recognition lines. Therefore, the object positioning system can recognize, on the basis of the outline of an object, the position of the object that is being too small to be marked, and precisely position the object even if the object has a chipped portion on its outer shape and the like.

An object position recognition system according to an aspect of the present invention recognizes an outline of an object having a flat face in a captured image of the object and recognizes the position of the object on the basis of the position of the outline, and the object positioning system includes an image capturing unit that captures an image of the object from a direction perpendicular to the flat face of the object, an illuminating unit that illuminates the flat face of the object from a direction parallel to an optical axis of the image capturing unit, and an image processing unit that performs calculations to find an outline of the object in the image captured by the image capturing unit, wherein the image processing unit includes a recognition-line setting unit that sets a plurality of recognition lines that are to be across the outline of the object in the image captured by the image capturing unit, a brightness-detecting unit that detects brightness of image on each of the recognition lines, a possible dark-transition-boundary detecting unit that detects, on each of the recognition lines, a possible boundary point of dark-transition where a bright-to-dark transition in brightness occurs from outside toward inside of the object, a possible bright-transition-boundary detecting unit that detects, on each of the recognition lines, a possible boundary point of bright-transition where a dark-to-bright transition in brightness occurs from outside toward inside of the object, an edge detecting unit that detects, on each of the recognition lines, an edge point on the basis of the possible dark-transition-boundary point and the possible bright-transition-boundary point, and an outline-determining unit that determines an outline of the object so that the outline minimizes the sum of deviations between the outline and the respective edge points detected on the recognition lines. Therefore, the object position recognition system can precisely recognize the position of an object that is too small to be marked, on the basis of the outline of the object, even if the object has a chipped portion on its outer shape and the like.

A method for adjoining objects according to an aspect of the present invention adjoins together a first object and a second object having a flat face, and the method includes a position correcting step of performing matching between a coordinate system used for recognizing position of the first object and a coordinate system used for recognizing position of the second object, a first position recognition step of recognizing position of the first object, a second position recognition step of recognizing position of the second object, an arranging step of moving the second object to a place at which the first object and the second object are to be adjoined together, and an adjoining step of adjoining the first object and the second object are adjoined together, wherein the second position recognition step includes a recognition-line setting step of setting a plurality of recognition lines that are to be across the outline of the second object in its captured image, an image capturing step of capturing an image of the second object being illuminated is captured, a brightness-detecting step of detecting brightness of image on each of the recognition lines, a possible dark-transition-boundary detecting step of detecting, on each of the recognition lines, a possible boundary point of dark-transition where a bright-to-dark transition in brightness occurs from outside toward inside of the second object, a possible bright-transition-boundary detecting step of detecting, on each of the recognition lines, a possible boundary point of bright-transition where a dark-to-bright transition in brightness occurs from outside toward inside of the second object, an edge-point detecting step of detecting, on each of the recognition lines, an edge point of the second object on the basis of the possible dark-transition-boundary point and the possible bright-transition-boundary point, and an outline-determining step of determining an outline of the second object so that the outline minimizes the sum of deviations between the outline and the respective edge points detected on the recognition lines, to recognize the position of the second object according to the determined outline. Therefore, the position of an object that is too small to be marked can be recognized on the basis of its outline, and then the object can be precisely positioned to be adjoined, even if the object has a chipped portion on its outer shape and the like.

BRIEF DESCRIPTION OF THE DRAWINGS

Other aspects and advantages of the invention will become more apparent from the following detailed description, taken in conjunction with the attached drawings.

FIG. 12 are a cross-sectional view, taken along the optical axis of the image capturing unit, of an object's edge portion including a chipped portion, and views that show brightness distribution and brightness-derivative distribution on a recognition line around the edge portion;

FIG. 15 are a cross-sectional view, taken along the optical axis of the image capturing unit, of an object's edge portion which includes a chipped portion and a scratch apart from its edge, and views that show brightness distribution and brightness-derivative distribution on a recognition line around the edge portion;

FIG. 17 is an object adjoining sequence for the object adjoining system of Embodiment 3 according to the present invention.

DETAILED DESCRIPTION OF THE PREFERRED EMBODIMENTS

In the following description, numerous specific details are set forth in order to provide a thorough understanding of the present invention. It will be apparent, however, to one skilled in the art that the present invention may be practiced without some or all of these specific details.

Embodiment 1

An embodiment according to the present invention will be explained below. The present invention relates a position recognition system that recognizes a position of an object with a flat face on the basis of an outline of the flat face viewed from a direction perpendicular to the face, a positioning system that positions the object at a predetermined place using the thus recognized position, and a system and method for adjoining objects in which two objects whose positions are individually recognized, are arranged in a given relation to each other. Mainly applicable objects of the present invention include those with a size having a side length of about 0.5 millimeters to about several millimeters. Thus, the present invention also relates to a technique of recognizing an object position with an accuracy of up to about 0.5 micrometers to thereby position them. On the edge where a flat face of an object and side faces thereof join, there may be a chipped portion or a rollover—a portion further rounded off than the chipped one. An objective of the present invention is to precisely recognize a position of an object even if it has a chipped portion or a rollover.

Figure 1:
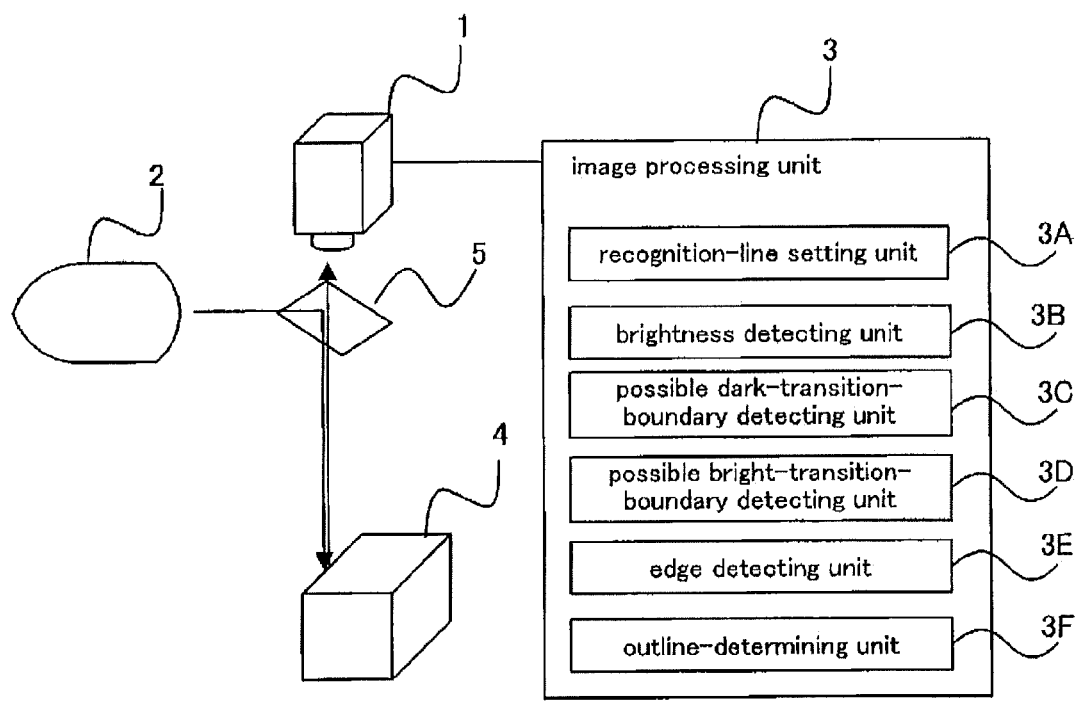
FIG. 1 is a view illustrating a configuration of an object positioning system of Embodiment 1 according to the present invention.

FIG. 1 is a view that illustrates a configuration of an object positioning system according to the present invention. An object 4 that is a target to be positioned is placed on a working table 6 (not shown in the figure). The top face of the object 4 is a flat face and the outer shape viewed from a direction perpendicular to the top face is a rectangle. The side faces of the object are perpendicular to the top face. The object positioning system includes a predetermined number of image capturing units 1 each of which captures, from a direction perpendicular to the top face of the object, an enlarged image of the object 4 including a portion of its outline, an illuminating unit 2 that illuminates the top face of the object from a direction parallel to optical axes of the image capturing units 1, an image processing unit 3 that processes the image including a portion of the outline of the object 4 obtained by the image capturing unit 1 to recognize the position of the object 4, and a half-mirror 5 that reflects light emitted from the illuminating unit 2 in a direction parallel to the optical axes of the image capturing units 1 and transmits light reflected from the object 4 to the image capturing units 1.

Figure 2:
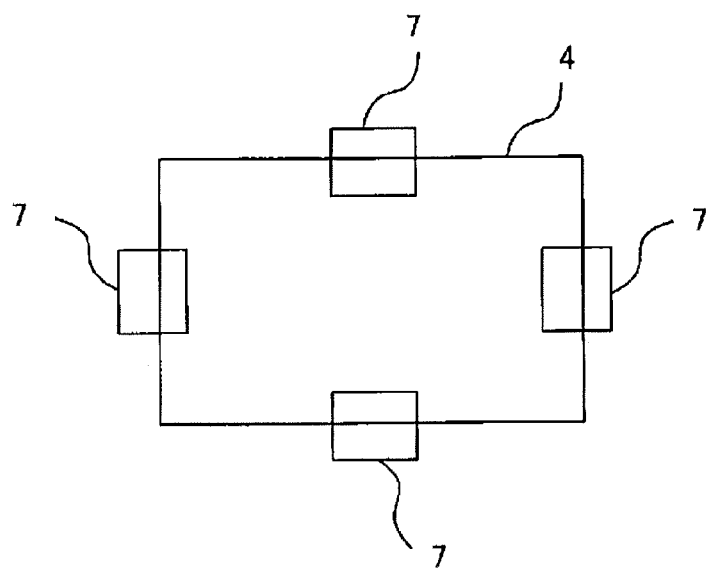
FIG. 2 is a view illustrating a positional relation between an object and images of the object captured by the object positioning system of Embodiment 1 according to the present invention.
Figure 4:
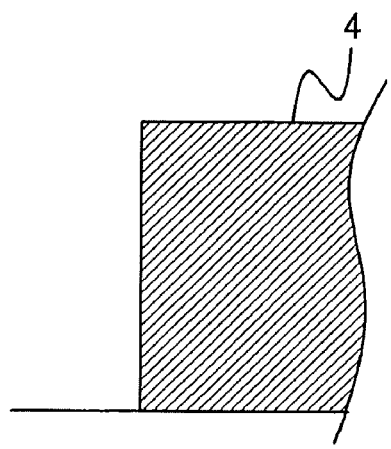
FIG. 4 is a cross-sectional view, taken along an optical axis of an image capturing unit, of an object's edge portion including neither a chipped portion nor a rollover.

In order to recognize the outline of the object 4, target image areas 7 for the respective image capturing units 1 are set around middle portions of four sides of the object 4, as shown in FIG. 4. From images of the object 4 that are captured by the image capturing units 1 to include portions of the outline of the objet 4, the position of the object 4 is recognized. The object 4 is in advance arranged so that the object 4 and the four image capturing units 1 are in a positional relation as shown in FIG. 2. For this purpose, an image of the whole object 4 may be captured to thereby roughly find the position of the object 4. The image capturing units 1 are adjusted in advance to be focused on the top face of the object 4.

Depending on an outer shape of an object, a required number—one or more—of the capturing units 1 are arranged at appropriate positions.

Figure 3:
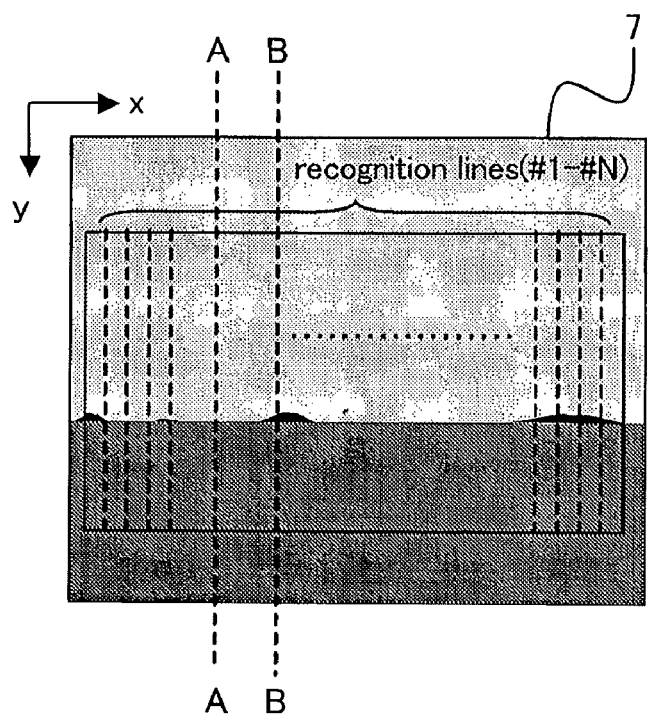
FIG. 3 is a view for explaining an example image of an object, captured by the object positioning system of Embodiment 1 according to the present invention.

FIG. 3 shows an example image captured by the system according to the present invention. The top face of the object 4 is a flat face and perpendicular to the optical axis of light from the illuminating unit 2 and the optical axes of the image capturing units 1. Thus, the top face of the object 4 reflects the illumination light well so that its image is captured as a bright portion in FIG. 3. The working table 6 is also perpendicular to the optical axis of the light from the illuminating unit 2 and the optical axes of the image capturing units 1; however, the working table is placed beyond the depth of field of image-forming optical system in the image capturing unit 1, so that the working table 6 is captured as a grey portion. With respect to chipped portions along object's edge, light reflected by the chipped portions does not enter into the image capturing unit 1, thus the chipped portions are captured as black portions.

Figure 5:
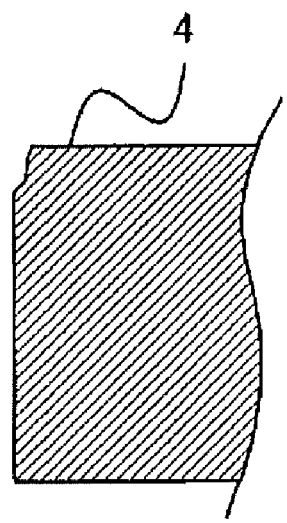
FIG. 5 is a cross-sectional view, taken along the optical axis of the image capturing unit, of an object's edge portion including a chipped portion.
Figure 6:
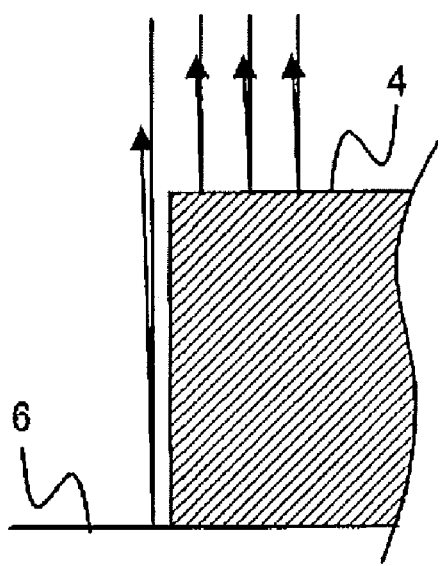
FIG. 6 is a cross-sectional view taken along the optical axis of the image capturing unit, illustrating how light emitted to an object is reflected around its edge portion including neither a chipped portion nor a rollover.
Figure 7:
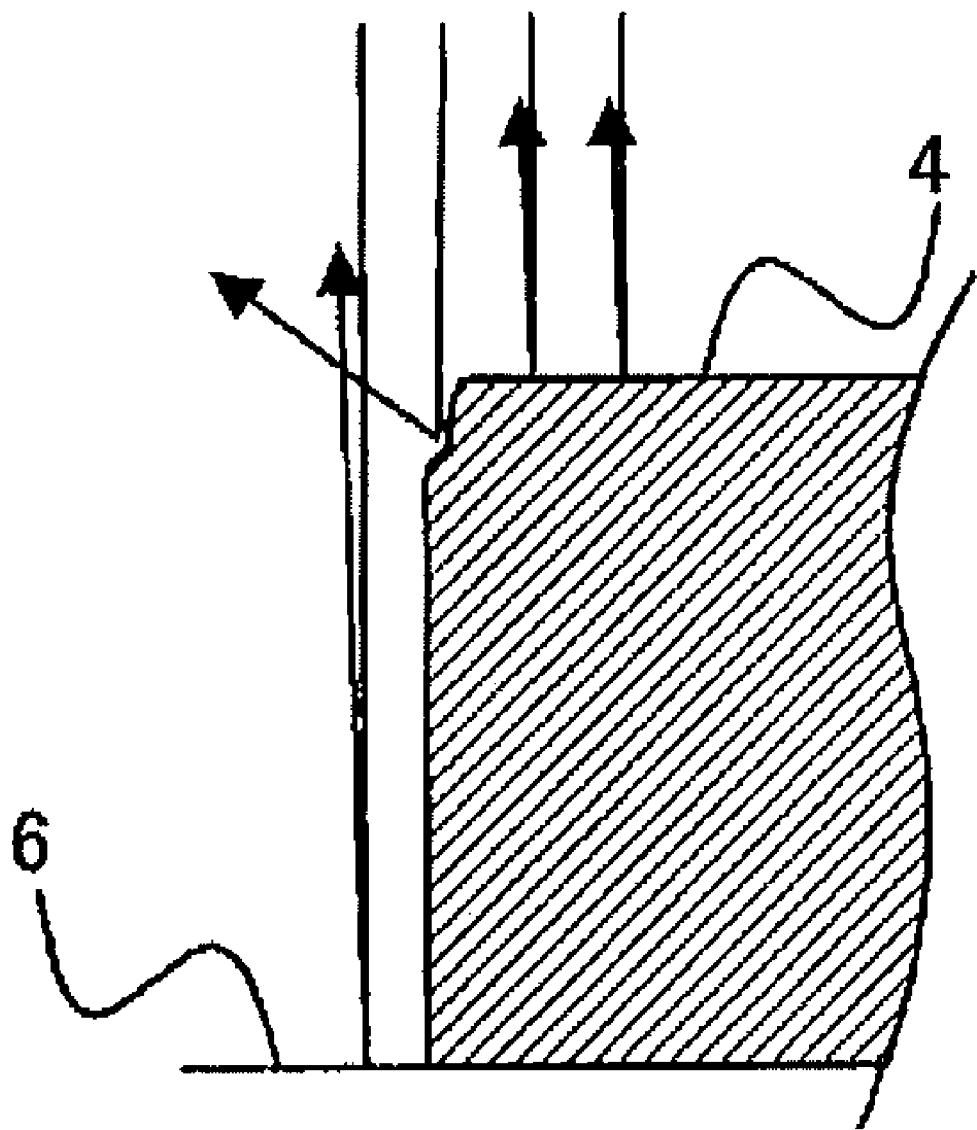
FIG. 7 is a cross-sectional view taken along the optical axis of the image capturing unit, illustrating how light emitted to an object is reflected around its edge portion including a chipped portion.

The reason why the images captured by the capturing units 1 are what described above will be explained, using FIGS. 4 through 7. FIG. 4 and FIG. 5 are cross-sectional views, taken along the optical axes of the image capturing units 1, of the object 4. FIG. 4 is also a cross-sectional view (taken along A-A Line in FIG. 3) of an object's edge portion including neither a chipped portion nor a rollover; FIG. 5 is also a cross-sectional view (taken along B-B Line in FIG. 3) of an object's edge portion including a chipped portion. FIG. 6 and FIG. 7 illustrate how light emitted from the illuminating unit 2 is reflected by the object 4 and the working table 6. FIG. 6 is a cross-sectional view that is, as shown in FIG. 4, taken along the optical axis of the image capturing unit, and illustrates how light emitted to an object is reflected around its edge portion including neither a chipped portion nor a rollover. FIG. 7 is a cross-sectional view that is, as shown in FIG. 5, taken along the optical axis of the image capturing unit, and illustrates how light emitted to an object is reflected around its edge portion including a chipped portion. As shown in FIG. 7, light reflected by the chipped portion travels in a direction different from that of the optical axes of the image capturing units 1. Other reflection light travels parallel to the optical axes of the image capturing units 1; however, because the image capturing units 1 are adjusted to focus on the top face of the object 4, the working table 6 is placed beyond the depth of field, which makes an image of the working table darker than that of the object 4. Therefore, the image capturing units 1 capture images of the top face of the object 4 as white and bright, the working table 6 as grey, and the chipped portion of the object 4 as black.

The image processing unit 3 includes a recognition-line setting unit 3A that sets an image processing area to perform image processing in the target image area 7 captured by the image capturing units 1 and sets a plurality of recognition lines that are to be across the outline of object 4 in the image processing area, a brightness-detecting unit 3B that detects brightness of image on each of the recognition lines, a possible dark-transition-boundary detecting unit 3C that detects, on each of the recognition lines, a possible boundary point of dark-transition where a bright-to-dark transition in brightness occurs from outside toward inside of the object, a possible bright-transition-boundary detecting unit 3D that detects, on each of the recognition lines, a possible boundary point of bright-transition where a dark-to-bright transition in brightness occurs from outside toward inside of the object, an edge detecting unit 3E that detects, on each of the recognition lines, an edge point on the basis of the possible dark-transition-boundary point and the possible bright-transition-boundary point, and an outline-determining unit 3F that determines an outline of the object so that the outline minimizes the sum of deviations between the outline and the edge points detected on the recognition lines.

Figure 8:
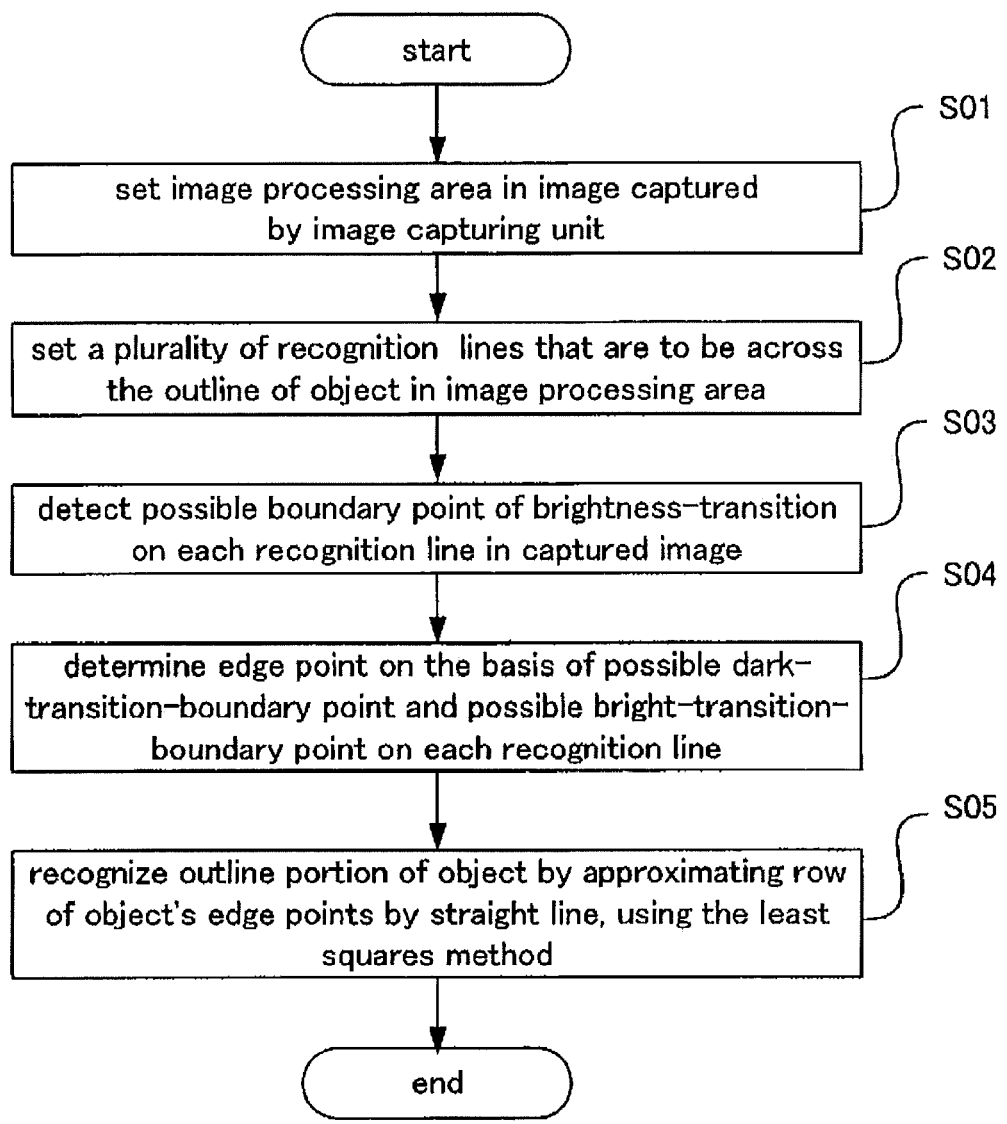
FIG. 8 is a view illustrating a sequence for recognizing an object position according to the object positioning system of Embodiment 1 of the present invention.

FIG. 8 illustrates a sequence for recognizing the position of an object performed by the image processing unit 3.

The image processing unit 3 adequately sets, at step S01, an image processing area for each of the images captured by the image capturing units 1. In FIG. 3, an inner full-line rectangle represents an image processing area. Purposes of setting an image processing area are to limit recognition area only within the vicinity of the outline of the object so as to make noises influence less, and to reduce processing time because of a smaller processing area. The image processing area is determined to have such a size that can cover a portion of the outline of the object 4 to be captured even when the object 4 is misaligned within a presumable degree.

In step S02, a plurality of recognition lines (N lines) are set in the image processing area in such a direction that the recognition lines are to be across the outline portion of the object 4. In FIG. 3, the recognition lines are drawn as broken lines in the image processing area. In FIG. 3, the outline portion of the object is in a x-direction, and the recognition lines are set, with predetermined intervals therebetween, in a y-direction being perpendicular to the outline portion of the object. The object image is captured as an upper half of image shown in the figure, thus an order to proceed image processing for each recognition line is set toward smaller y-coordinate values (in FIG. 3, in a from-bottom-to-top direction). The number N of the recognition lines is set as a sufficiently big number that allows estimation of the outline portion by the least squares method. If a portion of the outline is a straight line, it is necessary that N be about ten to about twenty.

Figure 9:
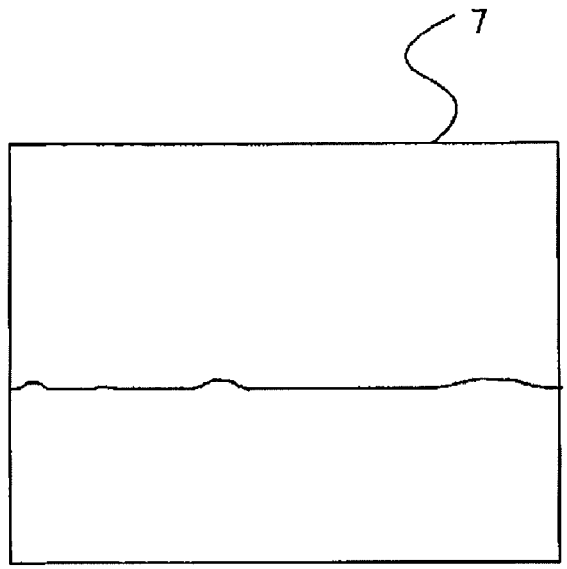
FIG. 9 is a view illustrating possible bright-transition-boundary points that are detected from a captured image in the object positioning system of Embodiment 1 according to the present invention.

In step S03, possible boundary points are detected on each of the recognition lines, based on changes in brightness of the captured image. How to detect possible boundary points for the object will be described later; FIG. 9 shows an image in which detected are possible bright-transition-boundary points in a captured image where a dark-to-bright transition in brightness occurs, and FIG. 10 shows an image in which detected are possible dark-transition-boundary points where a bright-to-dark transition occurs.

In FIG. 9, lines connecting between the detected possible bright-transition-boundary points include lines between an image of the object's surface and those of chipped portions, and between the image of the object's surface and that of the working table 6. The line between the image of the object's surface and that of the working table 6 is a portion of the object outline, however the line between the image of the object's surface and that of the chipped portion is not an outline portion of the object; thus, edge-related information shown in FIG. 9 that depends on the possible bright-transition-boundary points includes both correct and incorrect edge-related information.

Figure 10:
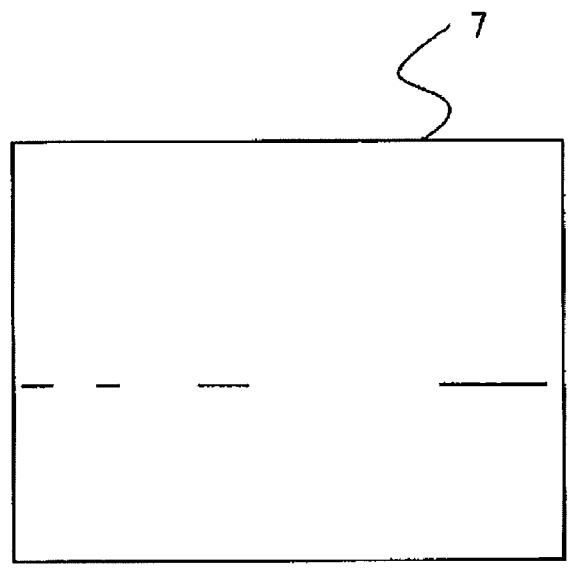
FIG. 10 is a view illustrating possible dark-transition-boundary points that are detected from the captured image in the object positioning system of Embodiment 1 according to the present invention.

In FIG. 10, the detected possible dark-transition-boundary points represent lines between the image of the working table 6 and those of the chipped portions, and the line between the image of the object's surface and that of the working table 6 is not detected. Thus, if the object has no chipped portions and the like, no possible dark-transition-boundary points are detected. Therefore, the possible dark-transition-boundary points shown in FIG. 10 at which bright-to-dark transitions occur are preferentially adopted as edge points. For the recognition lines on which no possible dark-transition-boundary points are detected, possible bright-transition-boundary points shown in FIG. 9 at which dark-to-bright transitions occur are adopted to detect edge points of the object's outline.

Figure 11:
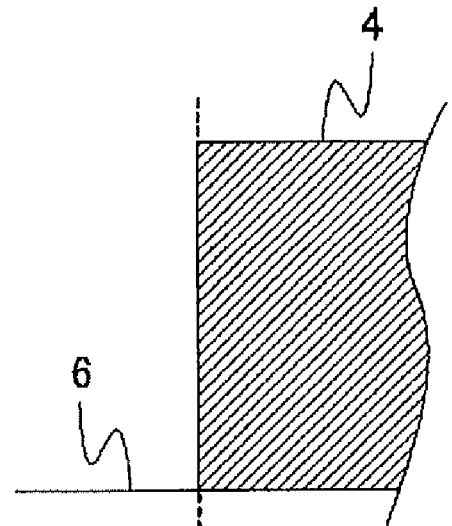
FIG. 11 are a cross-sectional view, taken along the optical axis of the image capturing unit, of an object's edge portion including neither a chipped portion nor a rollover, and views that show brightness distribution and brightness-derivative distribution on a recognition line around the edge portion.
Figure 11:
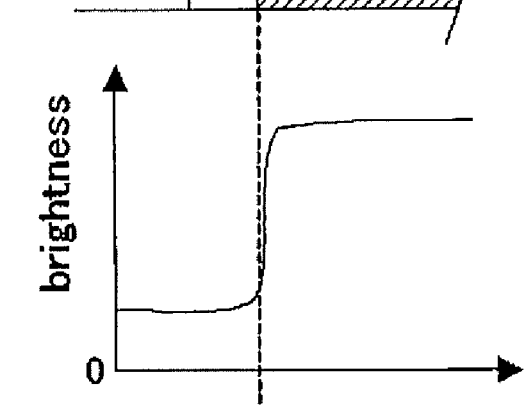
Figure 11:
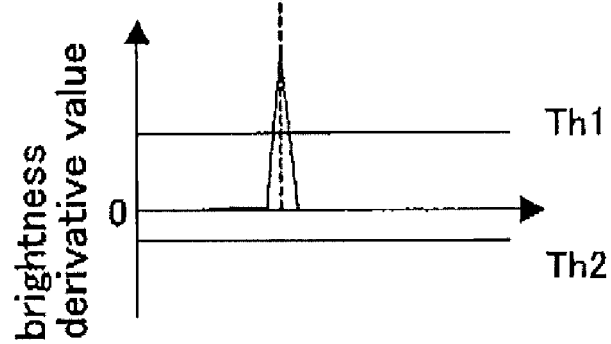

How to detect a possible boundary point will be explained below. FIG. 11 show a cross-sectional shape of the object along A-A line in FIG. 3, and distributions of brightness and brightness derivative on the recognition line. FIG. 11 are for a recognition line across a portion including neither a chipped portion nor a rollover. FIG. 12 show a cross-sectional shape along B-B line across a chipped portion of the object, and distributions of brightness and brightness derivative (differential value) on the recognition line. Brightness is expressed as an integer number by the use of a predetermined bit count. For example, the integer number expressed with eight bits ranges from 0 to 255. A brightness derivative at a given position on a recognition line is calculated by a brightness difference between pixels away from the given pixel back and forward by a predetermined number of pixels (for example, five pixels away).

In FIG. 12 which show a chipped portion at FIG. 12(1), images exist in the order of the working table 6, the chipped portion, and the surface of the object; thus, brightness on the recognition line changes as shown in FIG. 12(2), and brightness derivative changes as shown in FIG. 12(3). Here, a threshold value Th1 representing a brightness derivative for a dark-to-bright transition and a threshold value Th2 representing a brightness derivative for a bright-to-dark transition, are set to process brightness derivatives. Note that the threshold value Th1 is a positive value, and the threshold value Th2 is a negative value. When brightness detection proceeds along the recognition line and from outside toward inside of the object, detected are a possible dark-transition-boundary point at which a bright-to-dark transition occurs with its brightness derivative being negative and the absolute value of the derivative being greater than or equal to |Th2|, and a possible bright-transition-boundary point at which a dark-to-bright transition occurs with its brightness derivative being positive and the absolute value of the derivative being greater than or equal to |Th1|. Here, |Th1| is called a bright-transition-detection threshold value, and |Th2| is called a dark-transition-detection threshold value.

In FIG. 11 that show neither a chipped portion nor a rollover at FIG. 11(1), images exist in the order from the working table 6 to the surface of the object; thus, brightness on the recognition line changes as shown in FIG. 11(2), and brightness derivative changes as shown in FIG. 11(3). The brightness derivatives are processed, using Th1 and Th2, so that detected is a possible bright-transition-boundary point at which a dark-to-bright transition occurs with its brightness derivative being positive and the absolute value of the derivative being greater than or equal to |Th1|.

Figure 13:
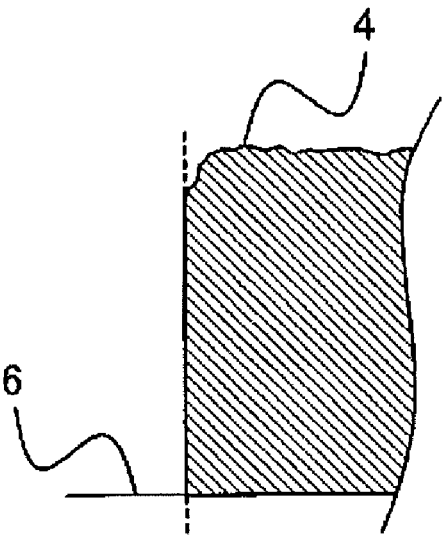
FIG. 13 are a cross-sectional view, taken along the optical axis of the image capturing unit, of an object's edge portion including a rough surface, and views that show brightness distribution and brightness-derivative distribution on a recognition line around the edge portion.
Figure 13:
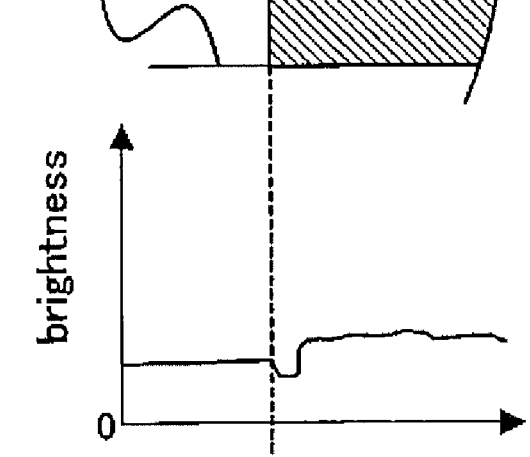
Figure 13:
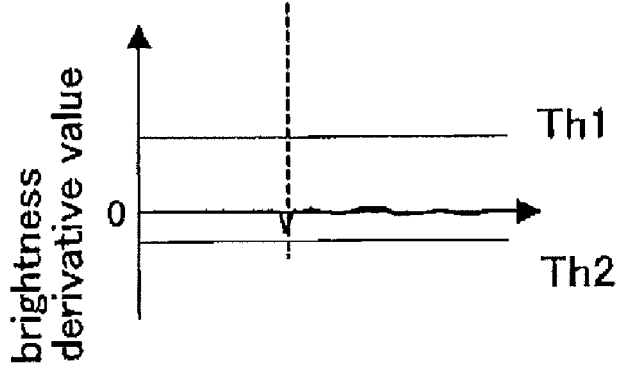

On the other hand, in a case as shown in FIG. 13(1) in which the object has roughness along a recognition line across the object surface so that the surface does not reflect light toward the image capturing unit, brightness varies as shown in FIG. 13(2) and brightness derivative varies as shown in FIG. 13(3). There is neither a position at which brightness derivative is positive and the absolute value of the derivative is greater than or equal to |Th1|, nor a position at which brightness derivative is negative and the absolute value of the derivative is greater than or equal to |Th2|, and thus any possible bright-transition-boundary point or dark-transition-boundary point is not detected.

In step S04, an edge point is determined among the possible dark-transition-boundary point and the possible bright-transition-boundary points for each recognition line. When a possible dark-transition-boundary point is detected for each recognition line, the possible dark-transition-boundary point is determined as the edge point. When a possible dark-transition-boundary point is not detected but a possible bright-transition-boundary point is detected, the possible bright-transition-boundary point is determined as the edge point. When neither a possible dark-transition-boundary point nor a possible bright-transition-boundary point is detected, it is determined that no edge point exists on the recognition line.

The process described above is performed for all recognition lines to collect up to N edge points for the object. Then, in step S05, an outline portion of the object can be recognized by approximating the outline portion by a straight line that minimizes the sum of distances between the straight line and the edge points. When portions of the outline are determined for four sides of the object, as shown in FIG. 2, a rectangular—the outer shape of the object—is recognized in its size, position, and direction.

The working table 6—an object arranging unit—is moved so that the recognized position of the object coincides with a predetermined place and the object faces in a predetermined direction. As described above, an object that is too small to be marked can be recognized in position on the basis of the outline of the object so as to be positioned precisely, even if the object has on its outer shape a chipped portion and the like.

According to an object position recognition systems that do not includes an object arranging unit, there is provided an effect of precisely recognizing the position of an object. By using the object position recognition system together with a system that moves an object and adjoins the object and another object, the object can be positioned at a place whose position is recognized precisely and be adjoined precisely.

When the outer shape of an object is a rectangle, the least squares method may be applied at one time to edge points on opposing sides so that the applied results of the opposing sides become parallel. When applying the least squares method, an edge point extremely away from a portion of the outline may not be processed. Instead of squared distances, other kind of deviational value may be used for approximation.

A portion of the outline to be determined by this method may not be a straight line, and may be a circle, an ellipse, a quadratic curve, or the like, so far as the outline portion has a shape that can be expressed by an equation with some parameters which can be determined so as to minimize the sum of deviations. The side face of the object may not be perpendicular to the object's flat face that is to be recognized as its outer shape.

An image processing unit may be provided for each of the image capturing units, or a single image processing unit may process a plurality of images captured by the image capturing units.

Possible dark-transition-boundary points and possible bright-transition-boundary points may be detected not according to their brightness derivatives, but according to their brightness. For example, an image area in which brightness values are larger than or equal to a bright-state threshold value may be determined as a bright image corresponding to the flat face of an object; an image area in which brightness values are smaller than a dark-state threshold value may be determined as a dark image corresponding to chipped portions or a rollover of the object; and an image area in which brightness values are smaller than the bright-state threshold value but larger than or equal to the dark-state threshold value may be determined as a medium bright image corresponding to the working table. When brightness detection proceeds along the recognition line and from outside toward inside of the object, detected are a point, as a possible bright-transition-boundary point, at which a medium-to-bright transition occurs, and a point, as a possible dark-transition-boundary point, at which a medium-to-dark transition occurs.

Although images of the object are captured from above to position the object, they may be captured from below, sideways, obliquely below, or obliquely above. A positioned object can also be fitted to another object positioned. Two objects that are each positioned by two positioning system according to the present invention can be adjoined to each other.

What has been described above is also applicable to other embodiments.

Embodiment 2

Figure 14:
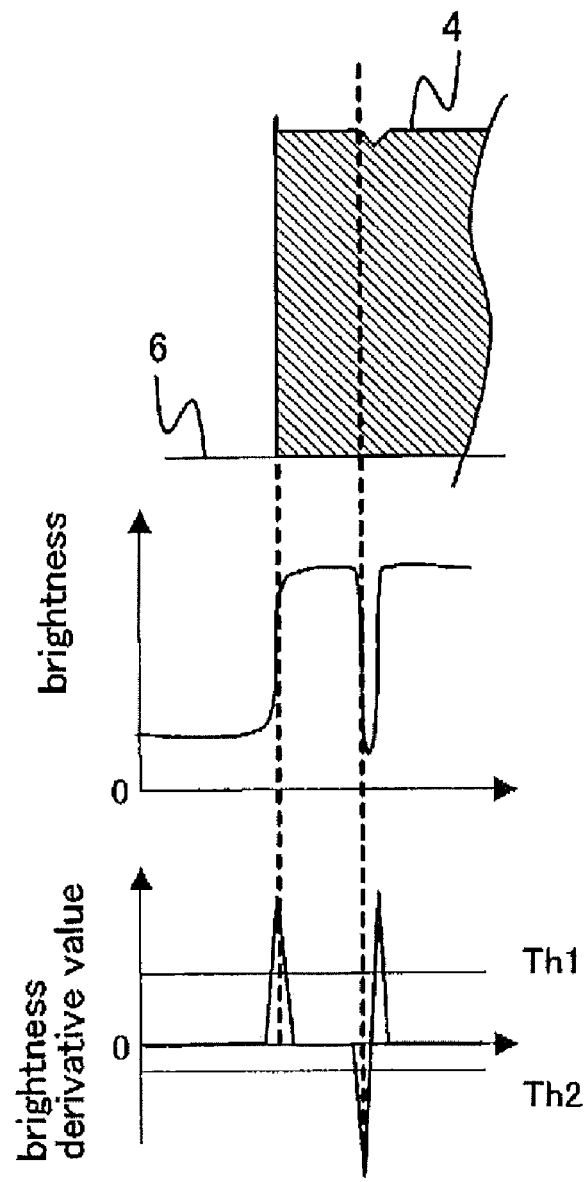
FIG. 14 are a cross-sectional view, taken along the optical axis of the image capturing unit, of an object's edge portion which includes neither a chipped portion nor a rollover but includes a scratch apart from its edge, and views that show brightness distribution and brightness-derivative distribution on a recognition line around the edge portion.

In Embodiment 2, precise determination of the outer shape of an object is possible even when the object has a scratch on its surface but not on its edge. FIG. 14 show a cross-sectional view, taken along a plane parallel to the optical axis of the image capturing unit, of an object including neither a chipped portion nor a rollover at its edge but including a scratch away from the edge, and distributions of brightness and brightness-derivative on a recognition line around the scratch. FIG. 15 are views showing a case in which the object has both a chipped portion on the edge and a scratch on its surface away from the edge.

In the case where a scratch exists on the object's surface, brightness not only changes at its edges, similarly as in FIG. 11 and FIG. 12, but also drops at the scratch, as shown in FIG. 14 (2) and FIG. 15 (2). At the point where brightness drops, detected are, as shown in FIG. 14 (3) and FIG. 15 (3), possible dark-transition-boundary point at which its brightness derivative is negative and the absolute value thereof changes to more than the dark-transition-detection threshold value |Th2|, and a possible bright-transition-boundary point at which its brightness derivative is positive and the absolute value thereof changes to more than or equal to the bright-transition-detection threshold value |Th1|.

If a possible dark-transition-boundary point is preferentially adopted as an edge point rather than a possible bright-transition-boundary point, in the case shown in FIG. 4, the point at which brightness drops inside of the object's outer shape is mistook for the edge point. In the case shown in FIG. 15, two possible dark-transition-boundary points are detected, thus it is necessary to determine one nearer to the outside of the object as an edge point. In either case, if the outermost point among possible dark-transition-boundary points and possible bright-transition-boundary points is to be determined as an edge point, the outline of the object can be detected more precisely.

Embodiment 3

Figure 16:
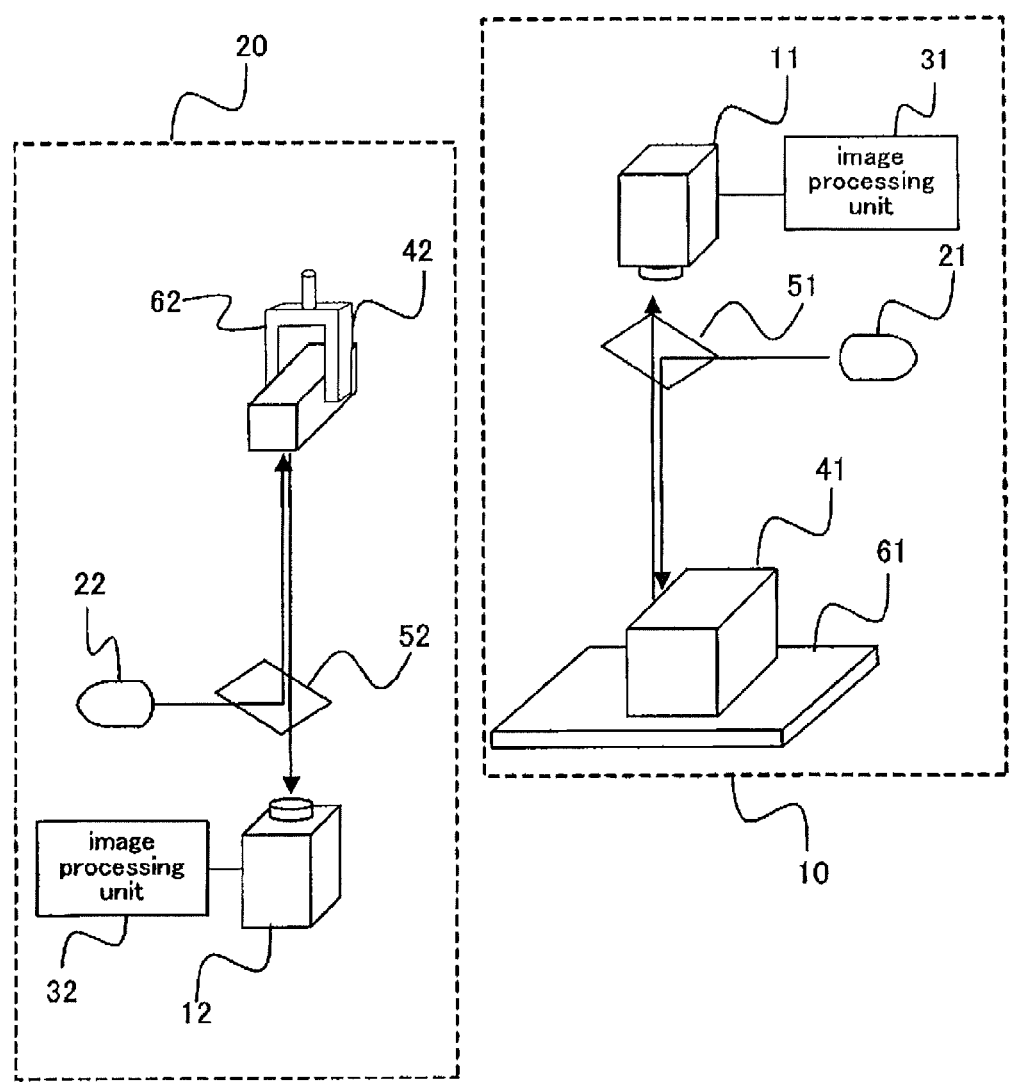
FIG. 16 is a view illustrating a configuration of an object adjoining system of Embodiment 3 according to the present invention.

Embodiment 3 is directed to recognizing positions of two objects (components) and then precisely adjoining them. FIG. 16 is a view that illustrates a configuration of an object adjoining system of Embodiment 3 according to the present invention. The object adjoining system includes a first positioning system 10 that recognizes the position of a first object 41, a second positioning system 20 that recognizes the position of a second object 42, a position correcting unit 30 (not shown in the figure) that makes a position recognized by the first positioning system 10 identical with a position recognized by the second positioning system 20, and an adjoining unit 40 (not shown in the figure) that adjoins the second object 42 to the first object 41. Here, "makes identical to each other the positions recognized" means that the two position recognition systems respectively recognize a position in space to be identical to each other within a predetermined tolerance.

The first object 41 whose shape is a cuboid is placed on a first working table 61. The first positioning system 10 that recognizes the position of the first object 41 includes a predetermined number of first image capturing units 11 each of which captures, from a direction perpendicular to the top face of the first object 41, an enlarged image of the first object 41 including a portion of its outline, a first illuminating unit 21 that illuminates the top face of the first object 41 from a direction parallel to optical axes of the first image capturing units 11, a first image processing unit 31 that processes images including the outline portion of the first object 41 obtained by the first image capturing units 11 to recognize the position of the first object 41, and a first half-mirror 51 that reflects light emitted from the first illuminating unit 21 in a direction parallel to the optical axes of the first image capturing units 11 and transmits light reflected from the first object 41 to the first image capturing units 11. The first image processing unit 31 has a configuration similar to that of the image processing unit 3 in Embodiment 1 or Embodiment 2.

A second object 42 that has a cuboid shape and is smaller than the first object is held from above by a second object holding unit 62. The second positioning system 20 that recognizes the position of the second object 42 includes a predetermined number of second image capturing units 12 each of which captures, from a direction perpendicular to the bottom face of the second object 42, an enlarged image of the second object 42 including a portion of its outline, a second illuminating unit 22 that illuminates the bottom face of the second object 42 from a direction parallel to optical axes of the second image capturing units 12, a second image processing unit 32 that processes images including the outline portion of the second object 42 obtained by the second image capturing units 12 to recognize the position of the second object 42, and a second half-mirror 52 that reflects light emitted from the second illuminating unit 22 in a direction parallel to the optical axes of the second image capturing units 12 and transmits light reflected from the second object 42 to the second image capturing units 12. The second image processing unit 32 has a configuration similar to that of the image processing unit 3 in Embodiment 1 and Embodiment 2.

In addition, the first positioning system 10 and the second positioning system 20 are arranged in advance at places where the systems do not interfere with each other in their positioning processing.

Each of the first positioning system 10 and the second positioning system 20 recognizes the position of an object, using the XYZ coordinate system in which X-axis, Y-axis, and Z-axis are orthogonal to one another. It is necessary that directions of X-axis, Y-axis, and Z-axis used for the first positioning system 10 are each identical to those used for the second positioning system 20, and the origin of coordinates for the systems are identical. If they are not, even the second object 42 is supposed to be moved to a position on the first object 41 where the objects are to be adjoined, the object is actually moved to a different position, so that the first object 41 and the second object 42 cannot precisely be adjoined.

The position correcting unit 30 makes the coordinate system used in the first positioning system 10 identical with that used in the second positioning system 20. This can make a position recognition result of the first positioning system 10, identical to that of the second positioning system 20. The type of the coordinate system for the first positioning system 10 may be different from that for the second positioning system 20; however, in that case, it is necessary that the position correcting unit 30 recognizes exactly the differences between the coordinate systems for the first positioning system 10 and the second positioning system 20 to precisely convert coordinates between the coordinate systems. In the present invention, "performing matching between coordinate systems" means making two coordinate systems identical or precisely converting coordinates between different coordinate systems so that a common position is recognized to be identical to each other in the coordinate systems.

The adjoining unit 40 applies an adhesive on the bottom face of the second object 42 or a portion of the first object 41 to which the second object 42 is mounted, and then adjoins to the first object 41, the second object 42 which is moved, by the second positioning system 20, to a position where the second object is to be adjoined to the first object 41. In addition, other methods such as soldering may be used to adjoin them.

FIG. 17 shows a sequence of adjoining objects using the object adjoining system of Embodiment 3 according to the present invention adjoins objects. At first, in step S21, the position correcting unit 30 makes coordinate systems of the first positioning system 10 and the second positioning system 20 identical. A well known method described in such as Japanese Patent No. 3523480 or Japanese Patent Laid Open No. 2005-34031 is used for making the coordinate systems identical.

In step S22, the first object 41 is placed on the first working table 61 of the first positioning system 10. A portion of the outline of the first object 41 placed on the plate is presumed to lie within the target image area of the first image capturing unit 11. In step S23, the position of the first object 41 is recognized by the method shown in FIG. 8. In step S24, the second object 42 is held by the second object holding unit 62 of the second positioning system 20, and then the second object holding unit 62 is moved so that a portion of the outline of the second object 42 lies within the target image area of the second image capturing unit 12. In step S25, the position of the second object 42 is recognized by the method shown in FIG. 8.

In step S26, the second object holding unit 62 is moved to a position at which the second object 42 is to be adjoined to the first object 41. Here, the first object 41 may also be moved. In step S27, the first object 41 and the second object 42 are adjoined by the adjoining unit 40.

Operations of step S22 through step S26 may be performed in an order different from that described above. For example, the operations in step S23 and step S25 may be performed at the same time. The operations in step S23 may be performed after the operations in step S25.

As described above, the position of an object that is too small to be marked can be recognized, and the object can be positioned precisely and adjoined on the basis of the outline of the object, even if the object has a chipped portion on its outer shape and the like.

The first object may be positioned by providing, if the first object being big enough to be marked, a mark or the like thereon, or by providing on/in the object an engaging portion such as a protrusion or a hole so as to engage the portion at a predetermined position. The position recognition system for the first object and that for the second object are adjusted in advance so that their recognition results are positionally identical to each other. In the case where the position recognition system for the first object does not exist because the position of the object is fixed, a coordinate system used for indicating the position of the first object and that used in the system for recognizing the position of the second object are matched to each other in advance.

REFERENCE NUMERALS 1 image capturing unit
11 first image capturing unit
12 second image capturing unit
2 illuminating unit
21 first illuminating unit
22 second illuminating unit
3 image processing unit
3A recognition-line setting unit
3B brightness-detecting unit
3C possible dark-transition-boundary detecting unit
3D possible bright-transition-boundary detecting unit
3E edge detecting unit
3F outline-determining unit
31 first image processing unit
32 second image processing unit
4 object
41 first object
42 second object
5 half-mirror
51 first half-mirror
52 second half-mirror
6 working table (object arranging unit)
61 first working table (first object arranging unit)
62 second working table (second object arranging unit)
7 target image area of image capturing unit
10 first positioning system
20 second positioning system
30 position correcting unit
40 adjoining unit

What is claimed is:

1. An object positioning system that recognizes a position of an object having a flat face on the basis of its outline in a captured image of the object and that positions the object at a predetermined place, the object positioning system comprising:
   an image capturing unit that captures an image of the object from a direction perpendicular to the flat face of the object;
   an illuminating unit that illuminates the flat face of the object from a direction parallel to an optical axis of the image capturing unit;

an image processing unit that performs calculation to find an outline of the object in the image captured by the image capturing unit; and an object arranging unit that moves the object, wherein the image processing unit includes:

a recognition-line setting unit that sets a plurality of recognition lines that are to be across the outline of the object in the image captured by the image capturing unit;

a brightness-detecting unit that detects brightness of image on each of the recognition lines;

a possible dark-transition-boundary detecting unit that detects, on each of the recognition lines, a possible boundary point of dark-transition where a bright-to-dark transition in brightness occurs from outside toward inside of the object;

a possible bright-transition-boundary detecting unit that detects, on each of the recognition lines, a possible boundary point of bright-transition where a dark-to-bright transition in brightness occurs from outside toward inside of the object;

an edge detecting unit that detects, on each of the recognition lines, an edge point on the basis of the possible dark-transition-boundary point and the possible bright-transition-boundary point; and an outline-determining unit that determines an outline of the object so that the outline minimizes the sum of deviations between the outline and the respective edge points detected on the recognition lines.

2. The object positioning system according to claim 1, wherein the possible dark-transition-boundary detecting unit detects, as said possible boundary point of dark-transition, a position where a differential value of brightness with respect to the position on each of the recognition lines and in outside-to-inside direction of the object is negative, and where the absolute value of the differential value varies from below a threshold value for detecting dark-transition to the threshold value or more, and the possible bright-transition-boundary detecting unit detects, as said possible boundary point of bright-transition, a position where a differential value of brightness with respect to the position on each of the recognition lines and in outside-to-inside direction of the object is positive, and where the absolute value of the differential value varies from below a threshold value for detecting bright-transition to the threshold value or more.

3. The object positioning system according to claim 1, wherein the possible dark-transition-boundary detecting unit detects, as said possible boundary point of dark-transition, a position on each of the recognition lines where its brightness varies in outside-to-inside direction of the object from a threshold value for detecting dark-state or more to below the threshold value, and the possible bright-transition-boundary detecting unit detects, as said possible boundary point of bright-transition, a position on each of the recognition lines where its brightness varies in outside-to-inside direction of the object from below a threshold value for detecting bright-state being larger than that for detecting dark-state to the threshold value or more.

4. The object positioning system according to claim 1, wherein the edge detecting unit determines, as the edge point, one among the possible dark-transition-boundary point and the possible bright-transition-boundary point, that is outermost of the object on each of the recognition lines.

5. The object positioning system according to claim 1, wherein, if the possible dark-transition-boundary point is detected, the edge detecting unit determines the possible dark-transition-boundary point as the edge point, and if the possible dark-transition-boundary point is not detected but the possible bright-transition-boundary point is detected, the unit determines this possible bright-transition-boundary point as the edge point.

6. The object positioning system according to claim 1, wherein the outline-determining unit determines the outline so that the outline minimizes the sum of squares of distances between the outline and the edge points detected on the recognition lines.

7. An object position recognition system that recognizes an outline of an object having a flat face in a captured image of the object and recognizes the position of the object on the basis of the position of the outline, wherein the object positioning system comprises:

an image capturing unit that captures an image of the object from a direction perpendicular to the flat face of the object;

an illuminating unit that illuminates the flat face of the object from a direction parallel to an optical axis of the image capturing unit; and an image processing unit that performs calculations to find an outline of the object in the image, captured by the image capturing unit, wherein the image processing unit includes:

a recognition-line setting unit that sets a plurality of recognition lines that are to be across the outline of the object in the image captured by the image capturing unit;

a brightness-detecting unit that detects brightness of image on each of the recognition lines;

a possible dark-transition-boundary detecting unit that detects, on each of the recognition lines, a possible boundary point of dark-transition where a bright-to-dark transition in brightness occurs from outside toward inside of the object;

a possible bright-transition-boundary detecting unit that detects, on each of the recognition lines, a possible boundary point of bright-transition where a dark-to-bright transition in brightness occurs from outside toward inside of the object;

an edge detecting unit that detects, on each of the recognition lines, an edge point on the basis of the possible dark-transition-boundary point and the possible bright-transition-boundary point; and an outline-determining unit that determines an outline of the object so that the outline minimizes the sum of deviations between the outline and the respective edge points detected on the recognition lines.

8. A system for adjoining objects, comprising:

a first positioning system of the object positioning system according to claim 1, that positions a first object with a flat face at a predetermined place;

a second positioning system of the object positioning system according to claim 1, that positions a second object with a flat face at a place at which the second object is to be adjoined to the first object;

a position correcting unit that makes a position recognized by the first positioning system identical with a position recognized by the second positioning system; and an adjoining unit that adjoins the first object and the second object together.

9. A system for adjoining objects, comprising:

a first position recognition system of the object position recognition system according to claim 7, that recognizes a position of a first object with a flat face;

a second position recognition system of the object position recognition system according to claim 7, that recognizes a position of a second object with a flat face that is to be adjoined to first object;

a position correcting unit that makes identical each other, a position recognized by the first position recognition system and a position recognized by the second position recognition system;

an object arranging unit that moves the second object to a place at which the second object is to be adjoined to the first object; and an adjoining unit that adjoins the first object and the second object together.

10. A system for adjoining objects that adjoins to a first object arranged at a predetermined place a second object, comprising:

a positioning system according to claim 1 that positions the second object with a flat face at a place at which the second object is to be adjoined to the first object;

a position correcting unit that performs matching between a coordinate system used in the positioning system and a coordinate system used for determining where the first object is to be arranged; and an adjoining unit that adjoins the first object and the second object together.

11. A system for adjoining objects that adjoins to a first object arranged at a predetermined place a second object, comprising:

a position recognition system of the object position recognition system according to claim 7 that recognizes a position of the second object having a flat face;

a position correcting unit that performs matching between a coordinate system used in the position recognition system and a coordinate system used for determining where the first object is to be arranged;

an object arranging unit that moves the second object to a place at which the second object is to be adjoined to the first object; and an adjoining unit that adjoins the first object and the second object together.

12. A method for adjoining objects that adjoins together a first object and a second object having a flat face, comprising:

a position correcting step of performing matching between a coordinate system used for recognizing position of the first object and a coordinate system used for recognizing position of the second object;

a first position recognition step of recognizing position of the first object;

a second position recognition step of recognizing position of the second object;

an arranging step of moving the second object to a place at which the first object and the second object are to be adjoined together; and an adjoining step of adjoining the first object and the second object are adjoined together, wherein the second position recognition step includes:

a recognition-line setting step of setting a plurality of recognition lines that are to be across the outline of the second object in its captured image;

an image capturing step of capturing an image of the second object being illuminated is captured;

a brightness-detecting step of detecting brightness of image on each of the recognition lines;

a possible dark-transition-boundary detecting step of detecting, on each of the recognition lines, a possible boundary point of dark-transition where a bright-to-dark transition in brightness occurs from outside toward inside of the second object;

a possible bright-transition-boundary detecting step of detecting, on each of the recognition lines, a possible boundary point of bright-transition where a dark-to-bright transition in brightness occurs from outside toward inside of the second object;

an edge-point detecting step of detecting, on each of the recognition lines, an edge point of the second object on the basis of the possible dark-transition-boundary point and the possible bright-transition-boundary point; and an outline-determining step of determining an outline of the second object so that the outline minimizes the sum of deviations between the outline and the respective edge points detected on the recognition lines, to recognize the position of the second object according to the determined outline.

13. The method for adjoining objects according to claim 12, wherein the first object has a flat face, and the first position recognition step includes another recognition-line setting step of setting a plurality of recognition lines that are to be across the outline of the first object in its captured image, another image capturing step of capturing an image of the first object being illuminated is captured, another brightness-detecting step of detecting brightness of image on each of the recognition lines, another possible dark-transition-boundary detecting step of detecting, on each of the recognition lines, a possible boundary point of dark-transition where a bright-to-dark transition in brightness occurs from outside toward inside of the first object, another possible bright-transition-boundary detecting step of detecting, on each of the recognition lines, a possible boundary point of bright-transition where a dark-to-bright transition in brightness occurs from outside toward inside of the first object, another edge-point detecting step of detecting, on each of the recognition lines, an edge point of the first object on the basis of the possible dark-transition-boundary point and the possible bright-transition-boundary point, and another outline-determining step of determining an outline of the first object so that the outline minimizes the sum of deviations between the outline and the respective edge points detected on the recognition lines, to recognize the position of the first object according to the determined outline.

14. The method for adjoining objects together according to claim 12, wherein in the possible dark-transition-boundary detecting step, as said possible boundary point of dark-transition, a position is detected where a differential value of brightness with respect to the position on each of the recognition lines and in outside-to-inside direction of the object is negative, and where the absolute value of the differential value varies from below a threshold value for detecting dark-transition to the threshold value or more, and in the possible bright-transition-boundary detecting step, as said possible boundary point of bright-transition, a position is detected where a differential value of brightness with respect to the position on each of the recognition lines and in outside-to-inside direction of the object is positive, and where the absolute value of the differential value varies from below a threshold value for detecting bright-transition to the threshold value or more.

15. The method for adjoining objects together according to claim 12, wherein in the possible dark-transition-boundary detecting step, as said possible boundary point of dark-transition, a position is detected on each of the recognition lines where its brightness varies in outside-to-inside direction of the object from a threshold value for detecting dark-state or more to below the threshold value, and in the possible bright-transition-boundary detecting step, as said possible boundary point of bright-transition, a position is detected on each of the recognition lines where its brightness varies in outside-to-inside direction of the object from below a threshold value for detecting bright-state being larger than that for detecting dark-state to the threshold value or more.

16. The method for adjoining objects together according to claim 12, wherein in the edge detecting step, as the edge point, determined is one among the possible dark-transition-boundary point and the possible bright-transition-boundary point, that is outermost of the object on each of the recognition lines.

17. The method for adjoining objects together according to claim 12, wherein in the edge-point detecting step, if the possible dark-transition-boundary point is detected, this possible dark-transition-boundary point is determined as the edge point, and if the possible dark-transition-boundary point is not detected but the possible bright-transition-boundary point is detected, this possible bright-transition-boundary point is determined as the edge point.

18. The method for adjoining objects according to claim 12, wherein in the outline-determining step, the outline of the object is determined so that the outline minimizes the sum of squares of distances between the outline and the edge points detected on the recognition lines.

* * * * *